No. 675,505. Patented June 4, 1901.
A. BOLZANI.
BALL BEARING.
(Application filed Jan. 5, 1900.)
(No Model.)
Fig. 1
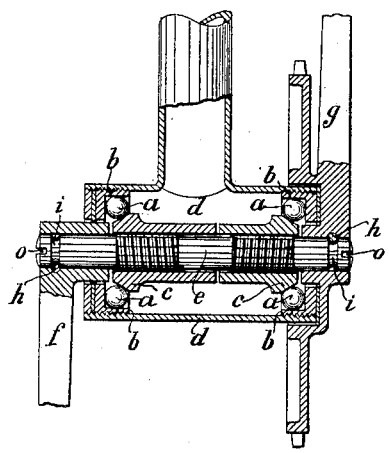
Fig. 2
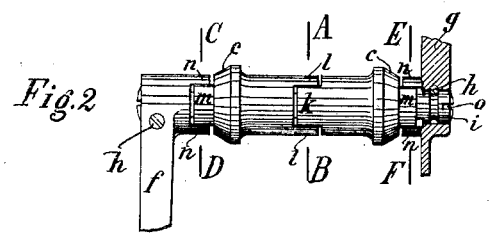
Fig. 4    Fig. 3    Fig. 5
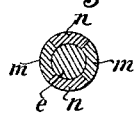 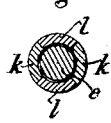 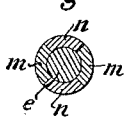
WITNESSES:
Ella L. Giles
Ellen Hough
INVENTOR
Anton Bolzani
BY
Richardson
ATTORNEYS
THE NORRIS PETERS CO., PHOTO-LITHO., WASHINGTON, D. C.

UNITED STATES PATENT OFFICE.

ANTON BOLZANI, OF BERLIN, GERMANY.

BALL-BEARING.

SPECIFICATION forming part of Letters Patent No. 675,505, dated June 4, 1901.

Application filed January 5, 1900. Serial No. 460. (No model.)

*To all whom it may concern:*

Be it known that I, ANTON BOLZANI, a subject of the King of Prussia, German Emperor, residing at Berlin, Kingdom of Prussia, Germany, have invented certain new and useful Improvements in Ball-Bearings; and I do hereby declare the following to be a full, clear, and exact description of the invention, such as will enable others skilled in the art to which it appertains to make and use the same.

In the case of ball-bearings as used at present the readjustment of the ball-races when worn is very difficult and almost impossible to any one except a mechanic. With some of the cycle-bearings it is useless for the rider, unless he himself is familiar with mechanical matters, to attempt such readjustment.

The present invention relates to a ball-bearing the special construction of which renders it possible to evenly readjust it by means of a key or even a pocket-knife and which, besides, offers the advantage that in doing so the pressure on both the sets of balls is distributed perfectly.

The bearing is represented in the accompanying drawings.

Figure 1 illustrates an axial section of a ball-bearing for a cycle chosen here by way of example; Fig. 2, a view of the axle, showing the inner races and a partial section of the pedal-crank, while Fig. 3 is a cross-section on the line A B of Fig. 2; Fig. 4, a cross-section on the line C D of Fig. 2, and Fig. 5 a cross-section on the line E F of Fig. 2.

The bearing contains, as usual, two sets or rings of balls $a$, arranged between the outer ball-race $b$ and the inner race $c$. The former may be constituted by an angular ring and the latter by a ball-cone. The shape of the bearing parts is, however, of no special importance here as long as they are so constituted that by means of an axial displacement they can be readjusted.

In the case of the bearings used at present the inner races are either solid with the axle or so fixed on it that they are connected to each other only by the axle. According to the present invention they are directly connected to each other and to the neighboring pieces fitted on the axle in such a way that the rotary movement of one of these pieces is transmitted to the others, while the rotary movement of the axle involves only an axial movement of the inner races against each other. For this purpose the outer races are fixedly arranged in the bearing-block, in this case, in the tubular casing $d$—*i. e.*, they are connected with it by means of a screw-thread, but are immovably fixed after mounting by set-screws. The inner races—in this case the cones $c$, the surfaces of which are inclined in opposite directions—are mounted on the axle $e$, which engages them by means of a screw-thread, the thread of one of the race rings or tubes being cut in a direction opposite to that of the other in such a manner that by turning the axle in one or the other direction the movable bearings will be moved either toward or from each other. The pedal-cranks $f$ $g$ are also loosely arranged on the axle $e$ and are prevented from slipping off by screws $h$, extending into an annular groove $i$, provided for that purpose on the axle. In order to connect the cranks with the inner bearings $c$ in such a manner that one is involved in the rotatory movement of the other, thereby forming for the purpose of rotation a single part, they are provided with claw or clutch couplings—*i. e.*, each part is provided with projections $k$ $l$ $m$ $n$, engaging with each other and adjustable in a longitudinal or axial direction, but immovably connected with each other as regards rotatory movement. It is evident that in this arrangement the axle $e$ is held only against bending and is not subject to torsional strain and that it cannot be turned unintentionally with the cranks after the coupling has been effected, and it is also clear that in turning the axle, which can be effected by means of a screw-driver applied to the notch $o$, provided in the faces of the axle, a readjustment of the bearings may be effected—*i. e.*, a relative movement from each other of the inner bearings $c$—in consequence of which the ball-race becomes reduced in width. It will therefore be easy for any one to readjust, for instance, such a cycle-bearing by turning the axle with a screw-driver or the like until the parts run easily and evenly.

I claim—

In a bearing, the combination with an axle having right and left threaded portions, of bearing rings or sleeves threaded on said axle, means for holding said sleeves against independent rotary movement with respect to each other but which permits independent longitudinal movement of the same; driving members outside the bearing and mounted on the axle to rotate independently thereof and confined against longitudinal movement thereon; and connections between each sleeve and corresponding driving member which permit relative longitudinal movement of these parts but prevent independent rotary motion of the same substantially as described.

In witness whereof I have hereunto set my hand in presence of two witnesses.

ANTON BOLZANI.

Witnesses:
OTTO KLEIST,
FRANZ EGGERS.